(12) United States Patent
Yi et al.

(10) Patent No.: US 7,764,344 B2
(45) Date of Patent: Jul. 27, 2010

(54) RUGGEDIZED AND HIGH-BRIGHTNESS LIQUID CRYSTAL DISPLAY AND METHOD OF MANUFACTURE

(76) Inventors: Brian Yi, 6477 Atlantic Ave., #186, Long Beach, CA (US) 90805; Eun Kyung Lee, 13519 Rose St., Cerritos, CA (US) 90703; Gene Huh, 7 Raines, Irvine, CA (US) 92602

( * ) Notice: Subject to any disclaimer, the term of this patent is extended or adjusted under 35 U.S.C. 154(b) by 400 days.

(21) Appl. No.: 11/827,625

(22) Filed: Jul. 12, 2007

(65) Prior Publication Data

US 2009/0015782 A1 Jan. 15, 2009

(51) Int. Cl.
*G02F 1/1333* (2006.01)
*G02F 1/13* (2006.01)

(52) U.S. Cl. .................. 349/122; 349/60; 349/158; 349/159; 349/160; 349/161; 349/187

(58) Field of Classification Search .............. 349/187, 349/158–161, 122, 60
See application file for complete search history.

(56) References Cited

U.S. PATENT DOCUMENTS

| 5,742,372 A * | 4/1998 | Furukawa .................. 349/187 |
| 2002/0149714 A1* | 10/2002 | Anderson et al. ............. 349/59 |
| 2005/0024566 A1* | 2/2005 | MacIntyre et al. .......... 349/122 |
| 2005/0202238 A1* | 9/2005 | Kishioka et al. ...... 428/355 AC |
| 2005/0212990 A1* | 9/2005 | Robinder .................... 349/58 |

* cited by examiner

*Primary Examiner*—Hoan C Nguyen
(74) *Attorney, Agent, or Firm*—Robert Nick

(57) ABSTRACT

A ruggedized, high brightness, liquid crystal display (LCD) unit having a thin display panel, a front cover glass faceplate and an improved backlight assembly is disclosed. The faceplate is bonded to the panel using an improved process to minimize panel deformation and the backlight assembly is configured with an array of selectively spaced light emitting diodes (LED's) adapted to provide a uniform high brightness display with a minimal quantity of LED's.

29 Claims, 3 Drawing Sheets

US 7,764,344 B2

RUGGEDIZED AND HIGH-BRIGHTNESS LIQUID CRYSTAL DISPLAY AND METHOD OF MANUFACTURE

FIELD OF THE INVENTION

The present invention relates to a method of manufacturing an improved liquid crystal display (LCD) and more particularly to a method of manufacturing a ruggedized, high-brightness, LCD.

BACKGROUND OF THE INVENTION

Liquid crystal displays (LCD's) are widely used in different types of electronic equipment including portable computers and portable data terminal devices. Typically, LCD's are comprised of a glass "sandwich" comprising front and back panels with liquid crystal elements sandwiched therebetween. To provide the best performance (clarity, brightness, angular visibility, resolution etc.), additional panels made of transparent or reflective plastic films are adhered to the front and back panels. Such panels include but are not limited to image enhancement polarizers, diffusers and the like.

High brightness LCD's are often required in compact, portable equipment and a typical display unit comprises a thin planar LCD sandwich with a light-guiding backlight assembly to illuminate the LCD for information display. The backlight assembly is adapted to provide a uniform distribution of light intensity across the LCD in order to present a uniform image on the display.

The backlight assembly may include one or more cold cathode fluorescent lamps (CCFL's) or an array of light-emitting diodes (LED's) configured to directly illuminate the back surface of the LCD. Alternatively, an array of LED's may be placed at one or more edges of the LCD to provide illumination.

The quantity of LED's required to provide a high-brightness display depends upon the size of the display panel and the luminance intensity of each LED. In addition, the amount of power required to operate the display, the heat generated by the display and the manufacturing cost are additional factors affecting the manufacturing process.

LCD's are inherently sensitive to shock, vibration and pressure. Many applications, however, including government and military, often require drop testing of a display unit onto concrete from a height of three or four feet.

To meet this requirement, a front cover glass faceplate is often used to ruggedize and protect the display panel. The cover glass may be adhesively attached to the front surface of the panel using double-sided adhesive foam tape, or can be optically bonded to the panel using suitable adhesive materials, well known in the art. Bonding methods, however, tend to physically deform the LCD sandwich causing non-uniform bright or dark spots in a uniformly excited image.

It can be appreciated that a ruggedized LCD unit having high brightness, low power consumption and a non-deforming cover glass structure would be a welcome addition to the LCD family.

BRIEF SUMMARY OF THE INVENTION

A ruggedized LCD unit is disclosed comprising a thin liquid crystal display panel, a rigid front cover glass faceplate attached to the panel and a LED backlight assembly. An exemplary method of bonding the faceplate to the display panel to minimize panel deformation is provided.

DETAILED DESCRIPTION OF THE INVENTION

Figure 1A:
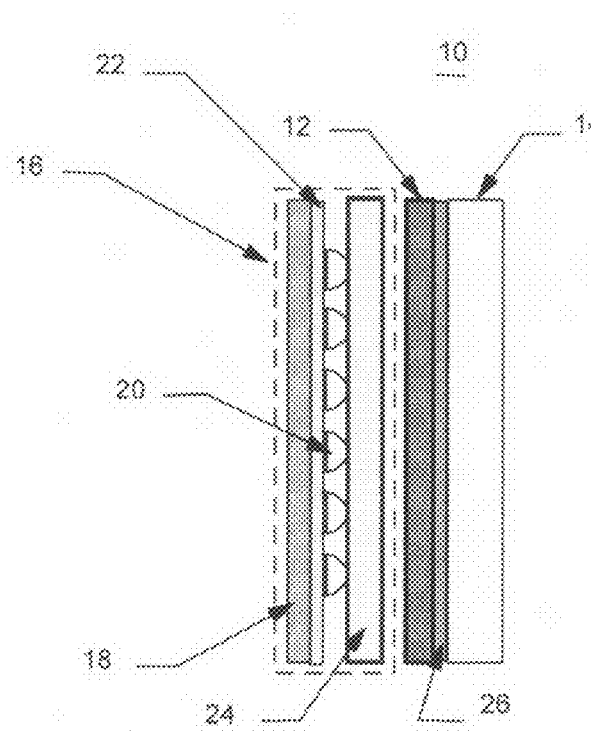
FIG. 1a is a cross-sectional view of an embodiment of the invention.

With reference to FIG. 1a, an embodiment of a ruggedized LCD unit 10 of the invention comprises the combination of a thin planar LCD sandwich panel 12, a rigid glass cover plate 14, and a light-guiding LED backlight assembly 16. The glass cover plate is preferably thicker than the LCD panel and serves to protect the panel to provide a ruggedized assembly. The cover plate is bonded to the LCD panel using an optically clear adhesive gel 26.

Figure 1B:
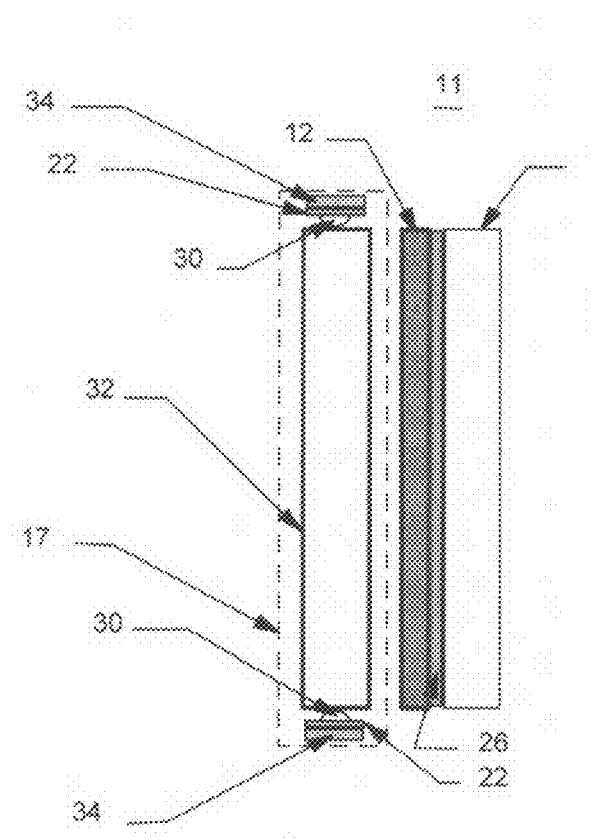
FIG. 1b is a cross-sectional view of another embodiment of the invention.

With reference to FIG. 1b, another embodiment of a ruggedized LCD unit 11 of the invention comprises the combination of a thin planar LCD sandwich panel 12, a rigid glass cover plate 14, and a light-guiding LED backlight assembly 17. The glass cover plate is preferably thicker than the LCD panel and serves to protect the panel to provide a ruggedized assembly. The cover plate is bonded to the LCD panel using an optically clear adhesive gel 26.

LED backlight assemblies for LCD panels are well known in the art. U.S. Pat. No. 7,052,152 issued to Harbers, for example, discloses a backlight assembly comprising a two-dimensional array of LED's placed in a square or hexagonal pattern with equidistant spacing between neighboring LED's.

Such backlight assemblies for high-brightness displays need a sufficient density of LED's in an array to get adequate brightness uniformity across the LCD panel. As the quantity of LED's increases, however, the power required to maintain the array increases and the heat generated by the array also increases. The generation of excessive heat is not desirable as the luminance of the panel is reciprocally related to heat. In addition, a display having high power requirements is not desirable for portable equipment.

Prior art LED backlight assemblies typically use an array of LED's having equidistant spacing between adjacent LED's. As such, some of the light energy produced by LED's located at the edges and corners of the array is wasted, as this portion of the light energy is not directed to the display.

The improved backlight assembly 16 of the invention as shown in FIG. 1a comprises an array of selectively spaced LED's 20 positioned behind a diffuser 24 adapted to direct light from the LED's to the LCD panel 12 to provide even illumination across the LCD panel. The LED's may be mounted to a substrate 18 having a reflector 22 to increase luminance. The substrate may also include thermally conductive tape to dissipate heat.

With reference to FIG. 1b, an edge-light embodiment of a backlight assembly of the invention 17 comprises a linear array of selectively spaced LED's 30 positioned along one or more edges of a light guiding panel (LGP) 32. The LGP is adapted to redirect light from the LED's to the LCD panel 12 to provide even illumination across the LCD panel. The LED's may be mounted to a substrate 34 having thermally conductive tape to dissipate heat and a reflector 22 to increase luminance.

LED's located at the ends of the array are spaced apart a greater distance than LED's located in the center portion of the array. As such, a fewer number of LED's is required to provide even illumination across the panel compared to prior art arrays having equidistantly spaced LED's.

A typical problem with prior art LCD panels having a bonded cover plate is that the panel becomes deformed during the process of inserting an adhesive between the panel and the cover plate. Pressure variations on the bonded surfaces tend to bow the thin LCD panel causing bright or dark spots in the displayed image.

A variety of techniques have been employed to try to reduce panel deformation caused by the bonding process. U.S. Pat. Application No. 20050212990 issued to Robinder, for example, discloses a mounting frame for holding the LCD panel and cover plate in vertical alignment when an adhesive is placed in a cavity formed between the panel and the plate. The adhesive is inserted until the cavity volume is filled. Pressure between the panel and the plate, however, would likely cause a thin, flexible LCD panel to be bowed during this process.

The improved bonding process of the invention, however, is effective to prevent bowing of the thin LCD panel. The novel process bonds a rigid, planar glass cover plate to a thin LCD panel in a unique manner, using an optically clear adhesive gel inserted in a space maintained between the panel and the cover plate.

Figure 2:
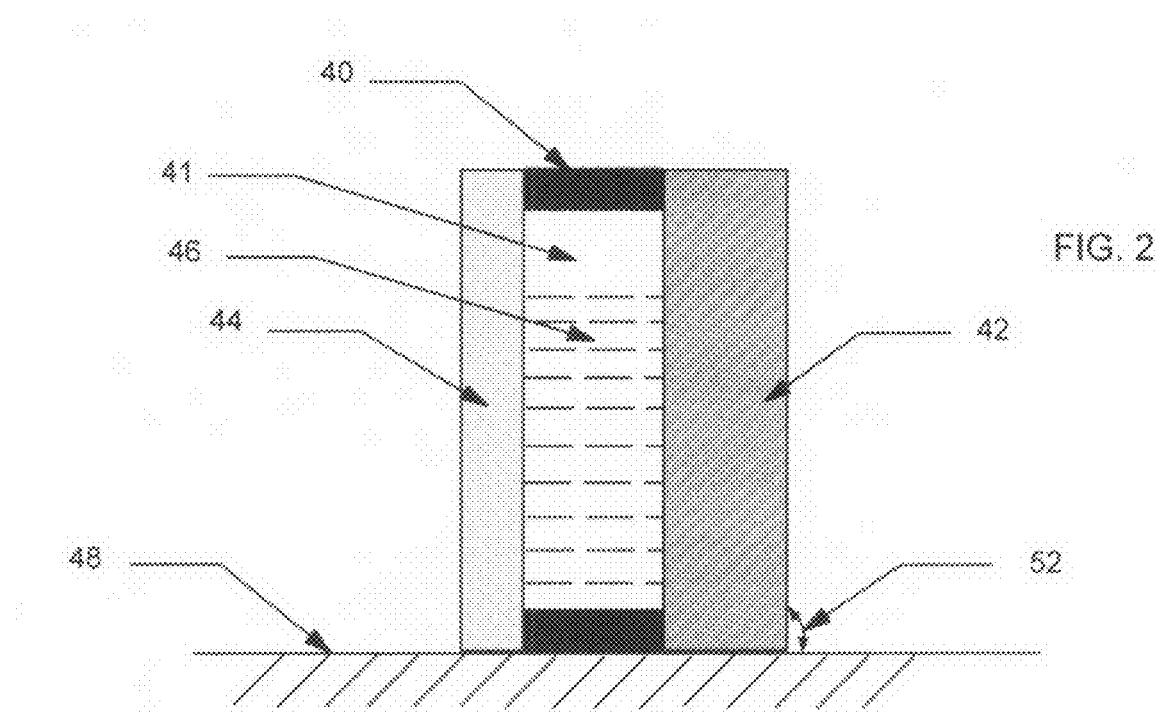
FIGS. 2a and 2b are illustrative views of a bonding assembly of the invention.
Figure 2:
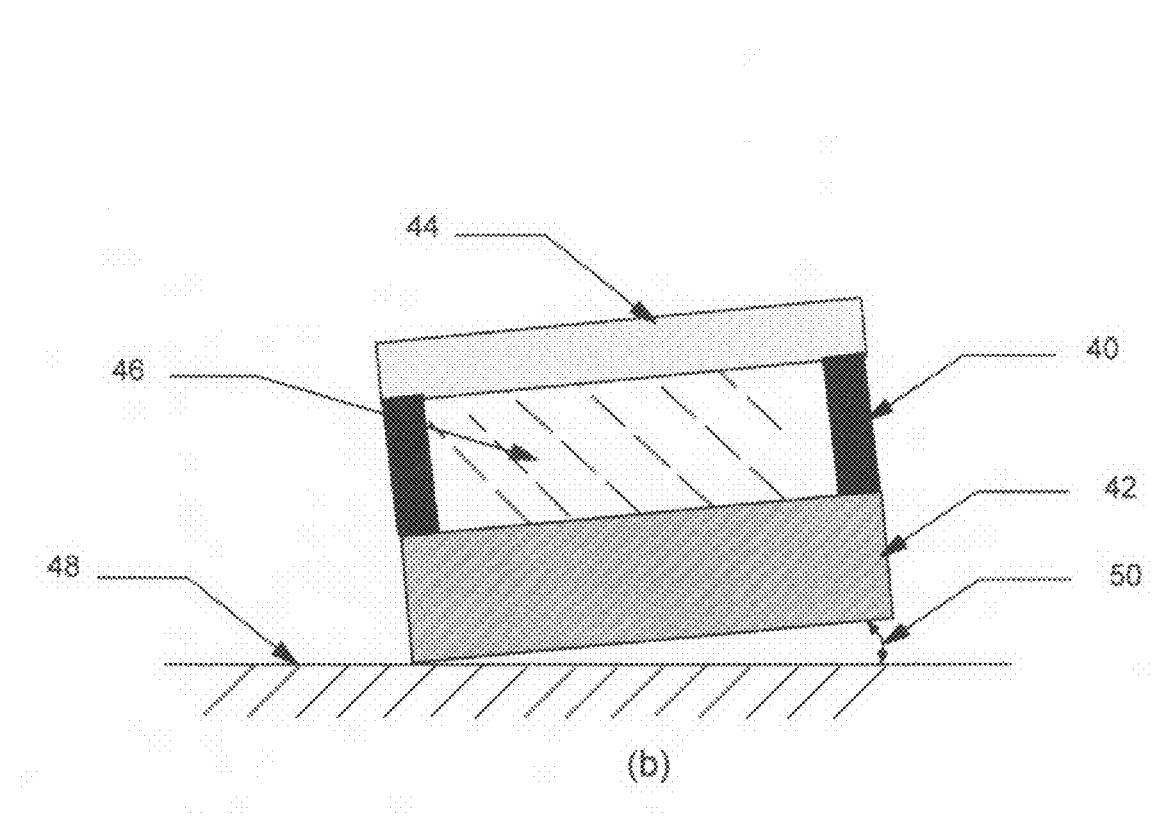

With reference to FIG. 2a, an illustrative assembly for bonding a cover plate 42 to an LCD panel 44 to is shown.

The assembly comprises a spacing element 40 arranged to assemble the panel and cover plate in a closely-spaced position of approximately one millimeter, preferably using a double-sided tape spacing element, approximately one millimeter thick and three millimeters wide, circumferentially adhered to the edges of the panel and cover plate to define a volume space 41 therebetween.

As illustrated, the assembly is initially placed in a vertical orientation with respect to a horizontal surface 48, at a tilt angle 52 of approximately ninety degrees.

The bonding process proceeds by injecting an optically clear adhesive gel 46 between the panel and plate to fill approximately 80% of the volume space.

With reference to FIG. 2b, the filled assembly is shown oriented to a selected tilt angle 50 of approximately three degrees from the horizontal surface 48, with the cover plate 42 in a downward position, for a time effective to permit the gel to uniformly distribute across the panel and plate surfaces without bowing the LCD panel 44.

The assembly is then repositioned to a vertical orientation as in FIG. 2a and heated for a time and at a temperature that is effective to cure the gel and bond the cover plate to the panel. The bonded cover plate and panel assembly can be used with different types of backlight asemblies as shown FIGS. 1a and 1b.

Figure 3:
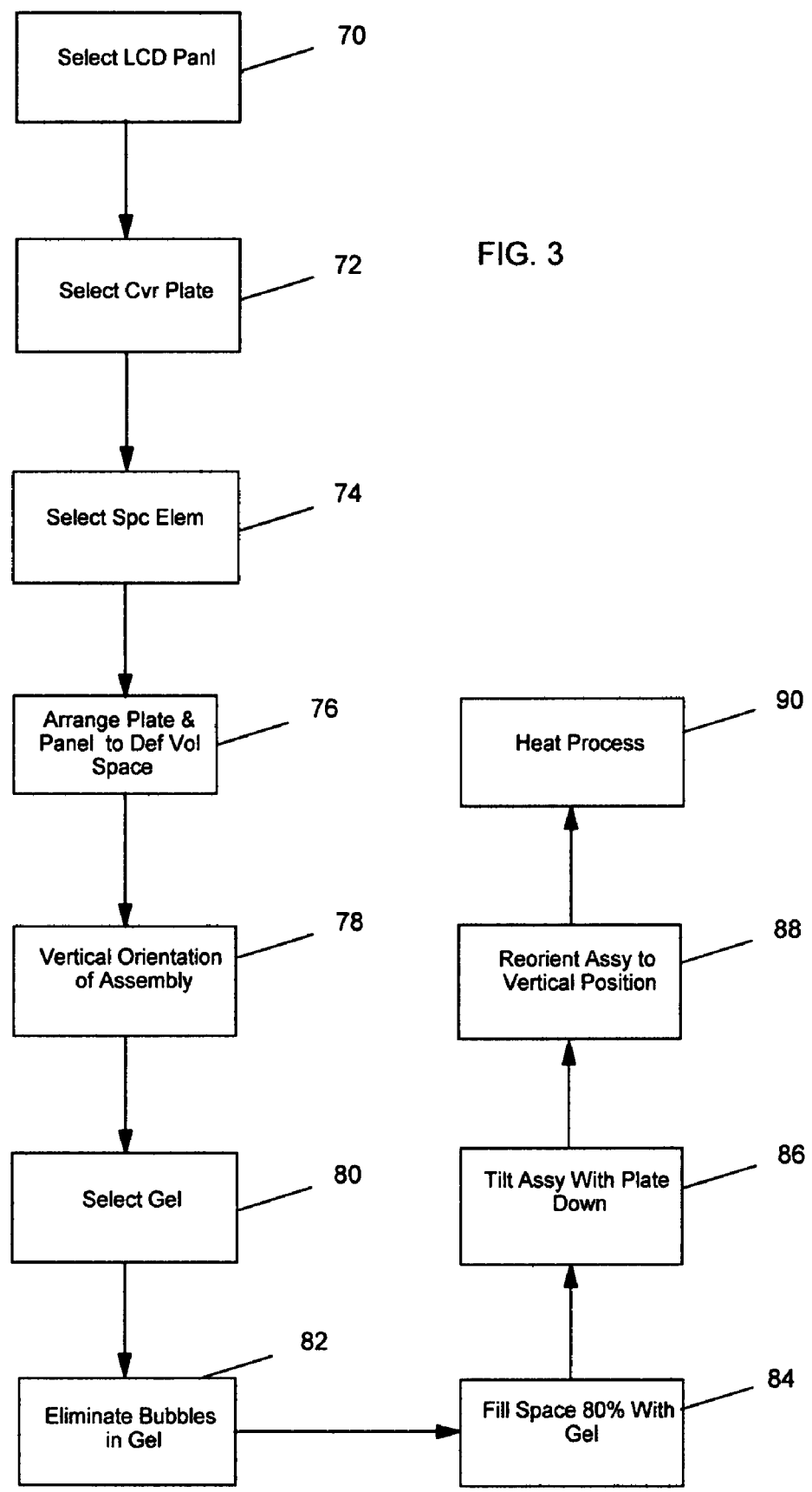
FIG. 3 is a flow diagram of the process of the invention.

With reference to FIG. 3, the bonding process of the invention comprises the steps of selecting an LCD panel as in step 70, preferably a thin, planar, LCD panel, selecting a cover plate as in step 72, preferably of rigid glass material, selecting a spacing element as in step 74, preferably a double-sided tape spacing element, approximately one millimeter thick and three millimeters wide, arranging the plate and panel in a closely-spaced juxtaposed position of approximately 1 mm, using the spacing element circumferentially adhered to the edges of the panel and cover plate to define a volume space therebetween, as in step 76, vertically orienting the panel and plate assembly as in step 78, selecting an optically clear adhesive gel as in step 80, eliminating any bubbles that may be present in the gel using a vacuum process or other means, as indicated in step 82, filling approximately 80% of the volume space with the bubble-free gel, as indicated in step 84 by injecting the bubble-free gel into the volume space, using a needle or similar device inserted through the spacing element, tilting the assembly with the plate facing downward to a selected angle of approximately three degrees from the horizontal, as in step 86, for a time effective to permit uniform distribution of the gel across the panel and plate surfaces, reorienting the uniformly filled assembly to a vertical position, as in step 88, and heating the assembly for a time and at a temperature to effectively cure the gel, as in step 90, it being understood that other means of curing the gel appropriate for the gel material, including but not limited to UV radiation, may be employed without detracting from the spirit of the invention, thereby allowing the LCD panel to be urged into a plane parallel to the cover plate and bonded thereto without causing significant deformation of the panel.

In order to insure effective light transmission through the LCD panel, gel and plate, the gel is preferably selected to have an index of refraction between the LCD panel and plate refractive indices.

The above description is considered as illustrative only of the principles of the invention. Accordingly, although the various features of novelty that characterize the invention have been described in terms of certain preferred embodiments, other embodiments will become apparent to those of ordinary skill in the art, in view of the disclosure herein. As such, the present invention is not limited by the recitation of the preferred embodiments, but is instead intended to be defined solely by reference to the appended claims.

What is claimed is:

1. A method for assembling a ruggedized information display comprising selecting a first flexible display member, and a second rigid cover plate planar member; and a third backlight means member to illuminate said first flexible display member and said second rigid cover plate planar member, arranging said first flexible display member and said second rigid cover plate planar member in a closely-spaced apart position, said first flexible display member and said second rigid cover plate planar member arranged with a spacing element to define an assembly with a volume space therebetween, orienting said assembly to a first vertical position, filling approximately eighty percent of said volume space with an optically transparent gel, tilting said assembly at a first angle with said second rigid cover plate planar member facing in a downward direction in a manner to permit distribution of said gel between said first and second members, reorienting said assembly to a second vertical position and heating said assembly for a time and at a temperature to effectively cure said gel, thereby allowing said first flexible member to be urged into a plane parallel to said second cover plate rigid planar member and bonded thereto without causing significant deformation of said first flexible member, said third backlight means member adapted to provide a uniform distribution of light intensity across said second rigid cover plate planar member and said third backlight means member.

2. A method as in claim 1 wherein said first flexible display member and said second rigid cover plate planar member have first and second indices of refraction and said gel has an index of refraction between said first and second indices.

3. A method as in claim 1 wherein said first vertical position is approximately ninety degrees from a horizontal plane.

4. A method as in claim 1 wherein said first angle is approximately three degrees from a horizontal plane.

5. A method as in claim 1 wherein said second vertical position is approximately ninety degrees from a horizontal plane.

6. A method as in claim 1 further comprising means to eliminate bubbles present in said gel.

7. A method as in claim 6 wherein said means to eliminate bubbles is a vacuum process.

8. A method as in claim 1 wherein said first flexible display member is a thin planar LCD sandwich panel and said second rigid planar member is a glass cover plate.

9. A method as in claim 1 wherein said closely-spaced apart position of said first flexible display member and said second rigid cover plate planar member is approximately one millimeter.

10. A method as in claim 1 wherein said spacing element is double-sided adhesive tape.

11. A method as in claim 10 wherein said tape is approximately one millimeter thick and three millimeters wide.

12. A method as in claim 10 wherein said spacing element is circumferentially adhered to edges of said first flexible display member and said second rigid cover plate planar member to define a volume space therebetween.

13. A method as in claim 1 wherein said filling step comprises injecting said gel into said volume space through said spacing element.

14. The backlight means member of claim 1 comprising an array of selectively spaced LED's wherein the spacing between adjacent LED's is greater at the ends of the array than in a center portion of the array.

15. The backlight means member of claim 1 comprising an array of selectively spaced LED's positioned along one or more edges of a light guiding panel.

16. A method for assembling a ruggedized information display comprising selecting an first LCD sandwich member, a second ridge cover plate member; and a third backlight means member to illuminate said first LCD sandwich member and said second ridge cover plate member, arranging said first LCD sandwich member and said second ridge cover plate member in a closely-spaced apart position with a spacing element to define an assembly with a volume space therebetween, orienting said assembly to a first vertical position, filling approximately eighty percent of said volume space with an optically transparent bubble-free gel, tilting said assembly at a first angle with said cover plate member facing in a downward direction in a manner to permit distribution of said gel between said members, reorienting said assembly thereafter to a second vertical position and heating said assembly for a time and at a temperature to effectively cure said gel, thereby allowing said LCD sandwich member to be urged into a plane parallel to said cover plate member and bonded thereto without causing significant deformation of said LCD sandwich member, said third backlight ht means member adapted to provide a uniform distribution of light intensity across said second ridge cover plate member and said third backlight means member.

17. A method as in claim 16 wherein said LCD sandwich member and said rigid cover plate member have first and second indices of refraction and said gel has an index of refraction between said first and second indices.

18. A method as in claim 16 wherein said first vertical position is approximately ninety degrees from a horizontal plane.

19. A method as in claim 16 wherein said first angle is approximately three degrees from a horizontal plane.

20. A method as in claim 16 wherein said second vertical position is approximately ninety degrees from a horizontal plane.

21. A method as in claim 16 wherein said LCD sandwich member is a thin, flexible LCD sandwich panel.

22. A method as in claim 16 wherein said cover plate member is glass.

23. A method as in claim 16 wherein said closely-spaced apart position is approximately one millimeter.

24. A method as in claim 16 wherein said spacing element is double-sided adhesive tape.

25. A method as in claim 16 wherein said adhesive tape is approximately one millimeter thick and three millimeters wide.

26. A method as in claim 16 wherein said spacing element is circumferentially adhered to edges of said members to define a volume space therebetween.

27. A method as in claim 16 wherein said filling step comprises injecting said gel into said volume space through said spacing element.

28. The backlight means member of claim 16 comprising an array of selectively spaced LED's wherein the spacing between adjacent LED's is greater at the ends of the array than in a center portion of the array.

29. The backlight means member of claim 16 comprising an array of selectively spaced LED's positioned along one or more edges of a light guiding panel.

* * * * *